United States Patent
Haimer (12)

(10) Patent No.: US 6,612,791 B1
(45) Date of Patent: Sep. 2, 2003

(54) CLAMPING DEVICE FOR CLAMPING A ROTATING MACHINE ELEMENT AND A BALANCING MACHINE HAVING COMPRISING SUCH A CLAMPING DEVICE

(75) Inventor: Franz Haimer, Igenhausen (DE)

(73) Assignee: Franz Haimer Maschinenbau KG, Igenhausen (DE)

( * ) Notice: Subject to any disclaimer, the term of this patent is extended or adjusted under 35 U.S.C. 154(b) by 0 days.

(21) Appl. No.: 09/889,576

(22) PCT Filed: Feb. 1, 1999

(86) PCT No.: PCT/EP99/00624

§ 371 (c)(1),
(2), (4) Date: Jul. 31, 2001

(87) PCT Pub. No.: WO00/45983

PCT Pub. Date: Aug. 10, 2000

(51) Int. Cl.$^7$ .................................................. B23C 9/00
(52) U.S. Cl. .................... 409/232; 279/2.03; 279/2.12; 408/239 A; 409/234
(58) Field of Search ................................. 409/232, 233, 409/234, 231; 279/2.03, 2.07, 2.09, 2.12, 145; 408/239 A, 239 R, 240

(56) References Cited

U.S. PATENT DOCUMENTS

| 4,560,310 A | * | 12/1985 | Eckstein et al. | ............. 279/155 |
| 5,322,304 A | * | 6/1994 | Rivin | ......................... 279/103 |
| 5,595,391 A | * | 1/1997 | Rivin | ......................... 279/103 |
| 5,639,194 A | * | 6/1997 | Harroun | ................. 408/239 R |

FOREIGN PATENT DOCUMENTS

| DE | 3726305 A | * | 2/1989 | ................. 409/233 |
| DE | 43 08 736 A1 | | 9/1994 | |
| DE | 296 23 092 U | | 10/1997 | |
| DE | 297 23 331 U | | 7/1998 | |
| EP | 0 247 410 A | | 12/1987 | |
| EP | 0373086 A | | 6/1990 | |
| EP | 0 557 240 A | | 8/1993 | |
| EP | 0 743 511 A | | 11/1996 | |
| EP | 0 782 896 A | | 7/1997 | |
| FR | 2 068 130 A | | 8/1971 | |
| JP | 140737 A | * | 6/1987 | ................. 409/233 |
| JP | 199308 A | * | 9/1987 | ................. 409/233 |

* cited by examiner

*Primary Examiner*—Daniel W. Howell
(74) *Attorney, Agent, or Firm*—Rothwell, Figg, Ernst & Manbeck

(57) ABSTRACT

A clamping device for clamping a machine element (3), in particular a tool holder for a drilling, milling or grinding tool or the like, which rotates about an axis of rotation (9), comprises a base body unit (11) which has a receiving opening (21) which is central with respect to the axis of rotation (9) and into which a coupling shank (5) of the machine element (3) can be fitted axially from one end, a chuck (23) which is arranged in the receiving opening (21), and a chuck-actuating unit (25), which is guided on the base body unit (11) in such a manner that it can be displaced in the axial direction relative to the latter, for actuating the chuck (23). In order to achieve a high reproducibility of the measurements of unbalance when using this clamping device (1) in a balancing machine, the chuck-actuating unit (25) is axially guided by means of a rolling body arrangement (35) on the base body unit (11), the rolling bodies (39) of which arrangement roll along rolling surfaces (41, 43) of the base body unit (11) and of the chuck-actuating unit (25). The rolling body arrangement (35) is preferably formed by a ball cage unit, the balls of which (39) are fitted with prestress between the base body unit (11) and the chuck-actuating unit (25).

36 Claims, 6 Drawing Sheets

Figure 1:
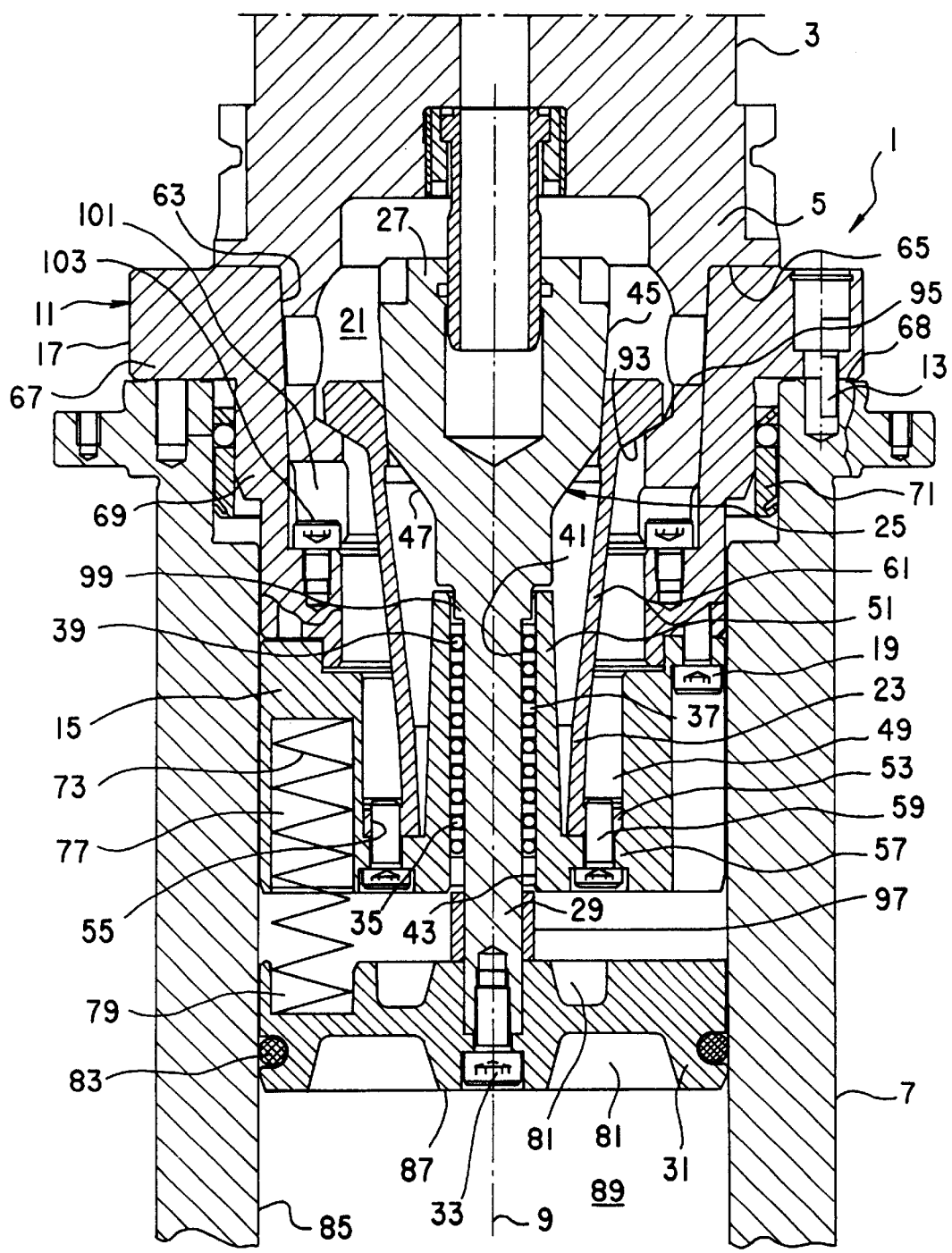

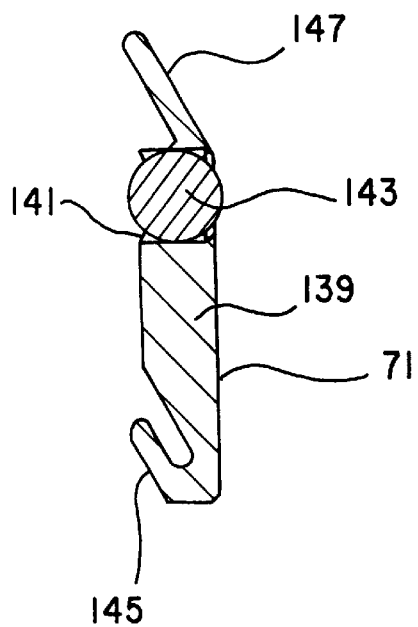
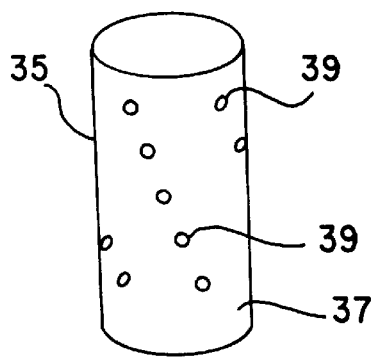
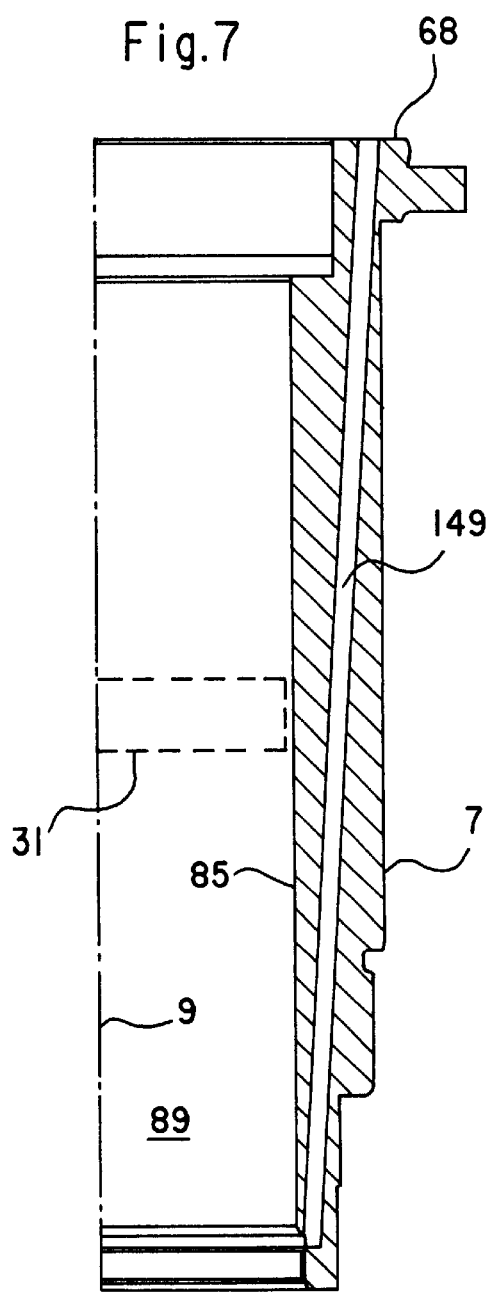

CLAMPING DEVICE FOR CLAMPING A ROTATING MACHINE ELEMENT AND A BALANCING MACHINE HAVING COMPRISING SUCH A CLAMPING DEVICE

The invention deals with the rotationally true clamping of rotating machine elements, in particular in a balancing machine.

Modern material-removing machine tools often use high-speed drills, mills or grinders (with rotational speeds in the range from 10,000 to 20,000 revolutions per minute, sometimes even up to 40,000 revolutions per minute or more), the cutting capacity of which is based not so much on a high cutting force and cut depth but rather on the high rotational speeds. On account of the high centrifugal forces which are generated at such rotational speeds, even a slight unbalance of the tools and their holders may have pronounced negative consequences. Firstly, the spindle bearings in which the drive spindle of the machine tool is mounted are exposed to nonuniform loads and become worn more quickly. Secondly, the cutting result deteriorates, which may become obvious, by way of example, through an increased surface roughness of the cut surface. Where the present text speaks of tool holders, this term is understood as meaning all possible holding means in which the actual milling, drilling or grinding tools can be clamped and which in turn can be coupled to the drive spindle of the machine tool. The term is aimed in particular at commercially available tool holders with standardized steep-taper or hollow steep-taper coupling shanks.

For the above reasons, the tool holders are first balanced on a balancing machine before being used in the machine tool. Conventional measures for balancing are fitting additional weights or introducing weight-reducing bores. To allow a measured inbalance to be unambiguously ascribed to the tool holder, extremely high demands are imposed on the unbalance freedom of the rotating parts of the balancing machine. This is because if the measured unbalance were to emanate at least in part from the balancing machine itself, the balancing measures taken on the basis of the results of the measurement on the tool holder could in the worst possible scenario even increase the unbalance of the tool holder. The clamping of the tool holder in the balancing machine has proven to be a problem area. A clamping device which is provided in a known balancing machine for clamping the tool holder comprises a base body unit which is attached to a machine spindle which is driven about an axis of rotation and a receiving opening which is central with respect to the axis of rotation and into which a coupling shank of the tool holder can be inserted axially from one end. The receiving opening passes all the way through the base body unit in the axial direction. A chuck is arranged in the receiving opening, which chuck engages on the coupling shank of the tool holder and can be actuated by a chuck-actuating unit which is guided on the base body unit in such a manner that it can be displaced in the axial direction relative to the latter. The chuck-actuating unit has double guidance on the base body unit from two pairs of sliding surfaces. To achieve highly accurate guiding, these pairs may be designed as transition fits, but this means that the chuck-actuating unit can only be displaced with very great difficulty with respect to the base body unit. Greater tolerances allow easier adjustment of the chuck-actuating unit. However, it has been found that these tolerances led to true-running faults making their presence felt in the measurement results, which in view of the high demands imposed on the true-running accuracy of the balancing machine, considerably impair the reproducibility of the measurements. This effect is intensified further by the double guidance of the chuck-actuating unit on the base body unit. However, reproducible unbalance measurements are necessary for high-precision fine balancing of the tool holder.

Accordingly, it is an object of the invention to provide a clamping device which is easy to operate, in particular for a balancing machine, with a high level of true-running accuracy.

In achieving this object, the invention is based on a clamping device for clamping a machine element, in particular a tool holder for a drilling, milling or grinding tool or the like, which rotates about an axis of rotation, comprising a base body unit which has a receiving opening which is central with respect to the axis of rotation and into which a coupling shank of the machine element can be fitted axially from one end, a chuck which is arranged in the receiving opening, and a chuck-actuating unit, which is guided on the base body unit in such a manner that it can be displaced in the axial direction relative to the latter, for actuating the chuck.

According to the invention, it is provided that the chuck-actuating unit is axially guided by means of a rolling body arrangement on the base body unit, the rolling bodies of which arrangement roll along rolling surfaces of the base body unit and of the chuck-actuating unit. The rolling body arrangement allows easy yet precise axial guidance of the chuck-actuating unit, in particular if the rolling bodies are fitted with prestress between the base body unit and the chuck-actuating unit. Tolerances which may impair the reproducibility of the measurements only have to be accepted to a significantly lesser extent, if at all, than is the case with the sliding fits of the known solution. Moreover, the guidance of the chuck-actuating unit by rolling bodies is distinguished by a reduced cost.

Although in principle it is conceivable to use rolling bodies designed in other ways, it will be expedient to use balls which are held in a cage inserted between the base body unit and the chuck-actuating unit. Ball cages of this type are commercially available at low cost. In order to keep the weight of the components of the clamping device which move relative to the base body unit low, the cage is expediently made from plastic. A small number of balls are still sufficient to achieve highly accurate guiding if the balls are held individually, offset from one another in the circumferential direction, in each case in one recess in the cage.

A compact structure of the clamping device results from the fact that the rolling body arrangement and the chuck are arranged at least partially inside one another in the axial direction. At the same time, it is in this way possible to use a chuck with a relatively great axial length and with a correspondingly high flexibility of its tongues without the overall space taken up being subject to restrictions from the rolling body arrangement.

The rolling body arrangement may be accommodated radially between a cylindrical inner lateral surface section of the receiving opening and a cylindrical outer lateral surface section of a shank part, which extends axially in the receiving opening, of the chuck-actuating unit. In this case, it is expedient for smooth running if the shank part is formed integrally with a chuck-engagement head, which engages on the chuck, of the chuck-actuating unit.

It is possible to provide for the shank part to extend out of an end of the receiving opening which is remote from the machine element, for, at that location, a force-introducing body, which serves to introduce the actuating force, to adjoin the shank part, and for this force-introducing body to be approximately in the form of a disk.

In a variant of the known solution discussed in the introduction, the chuck is held on the base body unit and is supported, by means of a clamping section, on the outer lateral surface of a cone head, which is substantially enclosed by this unit and tapers away from the machine element, of the chuck-actuating unit. In this arrangement, the chuck engages, by means of a radially projecting holding flange in the region of its end which is remote from the machine element, in an annular recess which has been machined from the receiving opening radially into the base body unit, where it is held with clearance to move.

By contrast, in the clamping device according to the invention, it is preferably provided that the chuck, in the region of its end which is axially remote from the machine element, is mounted fixedly on the base body unit. The fixed mounting of the chuck on the base body unit has led to an improvement of the true-running accuracy of the clamping device irrespective of the guidance of the chuck-actuating unit by rolling bodies.

In order, if desired, to be able to exchange the chuck, the chuck will expediently be screwed to the base body unit and, for this purpose, will have a plurality of axial receiving holes, which are distributed in the circumferential direction, for receiving attachment screws. However, the possibility of a press-fit connection between the chuck and the base body unit should not be excluded. A large axial space for the chuck can be provided by the fact that the chuck extends as far as the bottom of an annular recess, which is central with respect to the axis of rotation and is machined into the base body unit from that side of this unit which axially faces the machine element, and is secured in this annular recess.

In the abovementioned variant of the known clamping device, the base body unit comprises a first partial base body, with bearing surfaces which are intended to be in contact with the coupling shank of the machine element, and a second partial base body, which is produced separately from the first partial base body, is connected firmly but releasably to this first partial base body and on which the chuck-actuating unit is axially guided. In this arrangement, the chuck is held on the first partial base body.

In the clamping device according to the invention, however, the chuck is preferably held on the second partial base body. The two-part structure of the base body unit allows a modular system to be achieved. The bearing surfaces of the first partial base body can, within this modular system, be optimally adapted to the machine element which is in each case to be clamped. By way of example, a set of suitably different first partial base bodies can be manufactured for a set of steep-taper tool holders of different sizes. All these first partial base bodies have a uniform interface for interaction with the second partial base body, for which reason a single second partial base body, which can be combined with any of the first partial base bodies, is sufficient. The chuck generally also requires a different shape and/or size depending on the machine element which is in each case to be clamped. If, as in the known solution, the chuck is held on the first partial base body, it may be necessary, on account of the varying configuration of the first partial base body, for the interface between the first partial base body and the chuck also to be designed differently depending on the particular machine element. By contrast, if the chuck is held on the second partial base body, it is possible for all chucks which are manufactured for the different machine elements to be designed with a uniform interface for interaction with the second partial base body, which overall is of benefit to the design and manufacturing outlay on the modular system.

In order, when measuring the unbalance of the machine element, to be able to determine the precise angular location of an unbalance, an angle reference can be obtained by the fact that the base body unit bears at least one indexing projection, which is intended to engage in an indexing cutout in the coupling shank of the machine element. Naturally, the indexing projection may, if desired, be releasable if machine elements which are designed without a suitable indexing cutout are being clamped.

The possibility of arranging the rolling body arrangement in the receiving opening around a shank part of the chuck-actuating unit has previously been described.

A different location for fitting the rolling body arrangement may consist in the fact that the chuck-actuating unit, on that side of the base body unit which is axially remote from the machine element, has a force-introducing body, which serves to introduce an actuating force and has an annular flange, which projects toward the machine element and encloses an axial end section of the base body unit, and that the rolling body arrangement is accommodated radially between a cylindrical inner lateral surface section of the annular flange and a cylindrical outer lateral surface section of the axial end section of the base body unit. To avoid double guidance of the chuck-actuating unit, the latter is preferably unguided in the axial direction within the receiving opening.

The above text has discussed a variant in which the chuck is held on the base body unit. The chuck may alternatively be held on the chuck-actuating unit, so that it can be moved axially in the receiving opening. To clamp the machine element, the chuck-actuating unit then exerts a pulling action on the chuck. In this design, it is preferable for the chuck to be held radially in a clearance fit on the chuck-actuating unit and to be guided axially on the inner lateral surface of the receiving opening. The clearance fit leads to the chuck being decoupled from the chuck-actuating unit; instead, the chuck is guided separately from the chuck-actuating unit on the base body unit, namely on the inner lateral surface of the receiving opening. It has been found that the true-running accuracy of the clamping device is improved by this measure, even irrespective of the rolling body guidance.

Preferably, the chuck, in the region of its end which is axially remote from the machine element, has a cylindrical outer lateral surface section, by means of which it is axially guided on a cylindrical inner lateral surface section of the receiving opening. The cylindrical fit leads to the chuck being guided on the base body unit at its end which is remote from the machine element, so that true-running errors which could arise from any tensile expansion of the chuck are avoided. In addition, the chuck may be axially guided on the inner lateral surface of the receiving opening in the region of its end which is close to the machine element. Guiding the chuck at both ends in this way makes it possible to achieve an extremely high true-running accuracy.

To decouple the chuck from the chuck-actuating unit, it is also possible for the chuck to have an axial clearance with respect to the chuck-actuating unit. To prevent true-running errors caused by the positioning of chuck and chuck-actuating unit with respect to one another not being optimum from arising when the clamping device is rotating, it is possible for an engagement surface of the chuck, which is under tensile load from the chuck-actuating unit, to be designed as a centering surface, which is inclined toward the axis of rotation, for the chuck-actuating unit. The centering of the chuck-actuating unit on the chuck, which for its part is guided in the receiving opening, ensures extremely smooth running.

The chuck is preferably of single-part design and has a plurality of resilient tongues which are distributed in the circumferential direction and are separated from one another by axially extending slots which penetrate radially through the chuck and are open toward the machine element and closed away from the machine element.

At various points of the above text, mention has been made of a force-introducing body, which is arranged on that side of the base body unit which is remote from the machine element, as part of the chuck-actuating unit. This force-introducing body preferably forms a first support for spring means, for example a plurality of helical compression springs which are distributed in the circumferential direction and preload the chuck-actuating unit into a clamping position, in which the machine element is clamped fixedly by the chuck. The base body unit, in particular, serves as a second support for the spring means. In a preferred configuration of the clamping device according to the invention, the force-introducing body at the same time serves as the piston of a piston-cylinder arrangement, by means of which the chuck-actuating unit and therefore the chuck can be transferred into a release position, in which the machine element can be removed from the clamping device. The cylinder of this piston-cylinder arrangement may be formed by a drive spindle, which is designed as a hollow spindle and on which the base body unit can be mounted, expediently by means of screws. In order, in particular with such a design of the clamping device, to reduce the weight of the components which can move in the axial direction with respect to the base body unit, it is possible for at least one cutout, which serves primarily to save weight, to be machined into the force-introducing body or piston. A low weight of these axially moveable components has proven expedient in order to achieve highly smooth running of the clamping device.

It will be understood that the clamping device explained above is also suitable for clamping tools or workpieces which are to be machined in a machine tool, although a preferred field of application is the clamping of tool holders which are to be balanced in a balancing machine.

According to a further aspect, the invention relates to a clamping device for clamping a machine element, in particular a tool holder for a drilling, milling or grinding tool or the like, which rotates about an axis of rotation, comprising a drive spindle which is mounted so that it can rotate about the axis of rotation, a clamping set which can be mounted on the spindle, is preloaded in a clamping position by spring means, receives the machine element and clamps it in a rotationally fixed manner in its clamping position, a release device which, in order to release the machine element, transfers the clamping set out of its clamping position into a release position and has a coupling member, which is arranged on a stationary part of the clamping device and, in the at-rest state of the clamping device, links the release device to components of the clamping device which rotate when the clamping device is rotating.

According to the invention, in a clamping device of this type it is provided that the coupling member can be lifted off the rotating components of the clamping device, in such a manner that when the clamping device is rotating the coupling member is decoupled from the rotating components of the clamping device.

This measure acts to achieve the object which was set at the outset to the extent that, as a result of the coupling member being decoupled from the clamping device, the smooth running of the device in rotation is not disrupted by the coupling member and any frictional effects which arise when there is a constant coupling between the coupling member and the clamping device and would impair the ease of movement of the clamping device, are avoided.

Preferably, the coupling member can be displaced between an advanced position, in which it is coupled to the rotating components, and a retracted position, in which it is decoupled from the rotating components, and is resiliently preloaded into its retracted position. The preloading of the coupling member ensures a high level of operational reliability, since consequently the coupling member, during rotation of the clamping device, cannot unintentionally come into contact with the rotating components of the clamping device.

Preferably, the coupling member can be transferred out of its retracted position into its advanced position by fluid pressure, in particular pneumatic pressure, although the possibility of electromagnetic actuation of the coupling member, for example by means of a solenoid, is not ruled out.

In order to be able to apply the generally high release forces which the clamping set requires for release, it is recommended that the clamping set can be transferred out of its clamping position into its release position by fluid pressure, in particular pneumatic pressure, and for this purpose a piston-cylinder arrangement, the piston of which transmits a release force to the clamping set, is provided in the force-transmission path of the release force, which is generated by the release device. Since the spindle is often designed as a hollow spindle into which the clamping set is fitted from an open axial end, it may expediently at the same time form the cylinder of the piston-cylinder arrangement.

According to a preferred embodiment, the piston is fixedly connected to an axially moveable actuating member of the clamping set, a pressure chamber formed in the spindle is delimited on one side in the axial direction by the piston and on the other side in the axial direction by a closure wall which is arranged fixedly on the spindle, the closure wall has a connection opening for connection of a pressurized-fluid feedline, and the pressurized-fluid feedline has a connection stub which can be introduced into the connection opening and which forms the coupling member. This embodiment is advantageous since the only measure which is required in order to be able to introduce pressurized fluid into the pressure chamber and thereby release the machine element is for the connection stub to be introduced into the connection opening.

To prevent contamination from penetrating into the pressurized-fluid feedline, the connection stub may, in its retracted position, form a blocking location in the pressurized-fluid feedline, which is opened when the connection stub is transferred into its advanced position.

The structural outlay for the adjustment mechanism which allows the adjustment of the connection stub can be kept at a particularly low level if the connection stub can be transferred into its advanced position by the fluid pressure of a pressurized-fluid supply, which at the same time feeds pressurized fluid into the pressurized-fluid feedline.

In order to keep the outlay on components and design for the clamping set at a low level, it is recommended for the piston at the same time to be used to support the spring means.

When changing the machine element which is to be clamped, it may be necessary for the clamping set to be removed from the spindle in order for it to be changed over in a suitable way. If, during removal of the clamping set, the operator has forgotten to reduce the pressure in the pressure chamber beforehand, for example because he has forgotten to retract the connection stub, there is a risk that the clamping set will be suddenly thrown off the spindle by the pressure which is prevailing in the pressure chamber as soon as its attachment screws or other attachment members by means of which it is attached to the spindle are released. To prevent this risk, it is possible for a relief channel, which leads out of the pressure chamber at one end, and at the other end opens out in a spindle-side bearing surface for the clamping set, in particular an axial end face of the spindle, to be formed in the circumferential wall of the spindle.

According to a further aspect, the invention relates to a clamping device for clamping a machine element, in particular a tool holder for a drilling, milling or grinding tool or the like, which rotates about an axis of rotation, comprising a drive spindle which is mounted so that it can rotate about the axis of rotation and is designed as a hollow spindle, and a clamping set which can be mounted on the spindle, clamps the machine element in a rotationally fixed manner in a clamping position, and comprises a base body unit which can be inserted into the spindle from one spindle end, can be connected to the spindle in a rotationally and axially fixed manner and has a receiving opening which is central with respect to the axis of rotation and into which a coupling shank of the machine element can be fitted in the axial direction. According to the invention, in this arrangement it is provided that a ball cage, which centers the base body unit on the spindle, is fitted radially between the base body unit and the spindle.

The ball cage allows highly accurate centering of the base body unit on the spindle, which is of benefit to the true-running accuracy. Moreover, the ball cage allows simple insertion of the base body unit into the spindle and removal of this unit from the spindle, so that this aspect of the invention also serves to achieve the object which was set out at the outset.

Furthermore, the invention relates to a measuring device for measuring the unbalance of a machine element, in particular a tool holder for a drilling, milling or grinding tool or the like, which rotates about an axis of rotation, comprising a drive spindle which is mounted in a spindle housing in such a manner that it can rotate about the axis of rotation, a frame, from which the spindle housing is suspended, a force sensor arrangement which detects unbalance forces on the spindle housing, and clamping means for clamping the machine element in a rotationally fixed manner on the spindle. In this arrangement, the clamping means may be formed by a clamping device according to one of the aspects which have been explained above.

In rotary operation, lack of roundness of the spindle bearings and micro-deformation of the spindle housing may cause measurement errors which distort the measurement results. It has been found that measurement errors of this type can be minimized if the spindle housing is suspended from the frame by means of a leaf spring arrangement in such a manner that it is fixed so that it cannot be pushed or pulled in a first direction which is normal to the axis, but can be pivoted in a second direction which runs normal to the axis and transversely, in particular substantially perpendicularly, to the first direction, and the force sensor arrangement is arranged so as to detect force components in the second direction. A solution in which the leaf spring arrangement comprises two leaf springs which are arranged at an axial distance from one another, extend radially in the first direction and by means of which the spindle housing is suspended from the frame, has proven particularly expedient.

Figure 2:
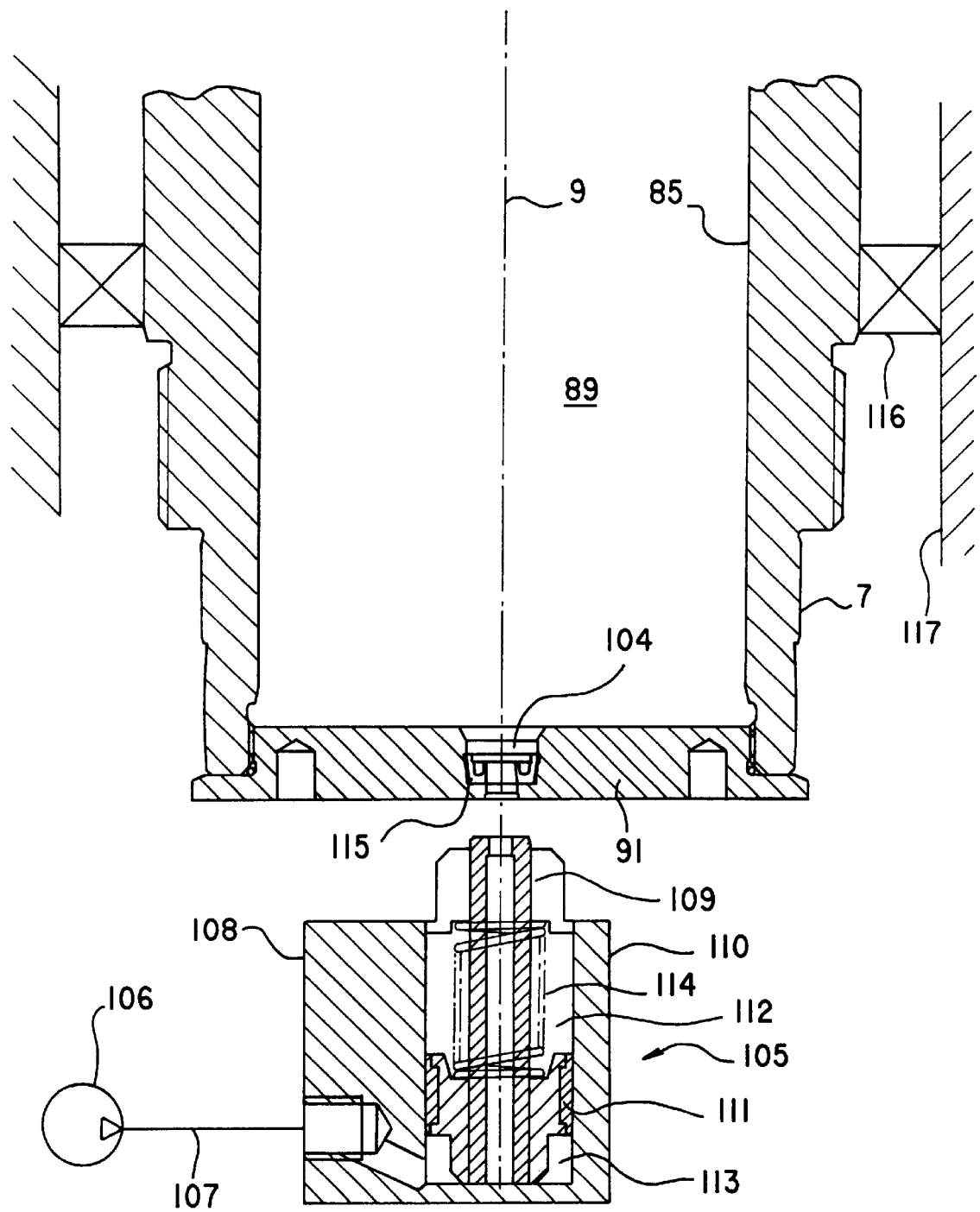
Figure 3:
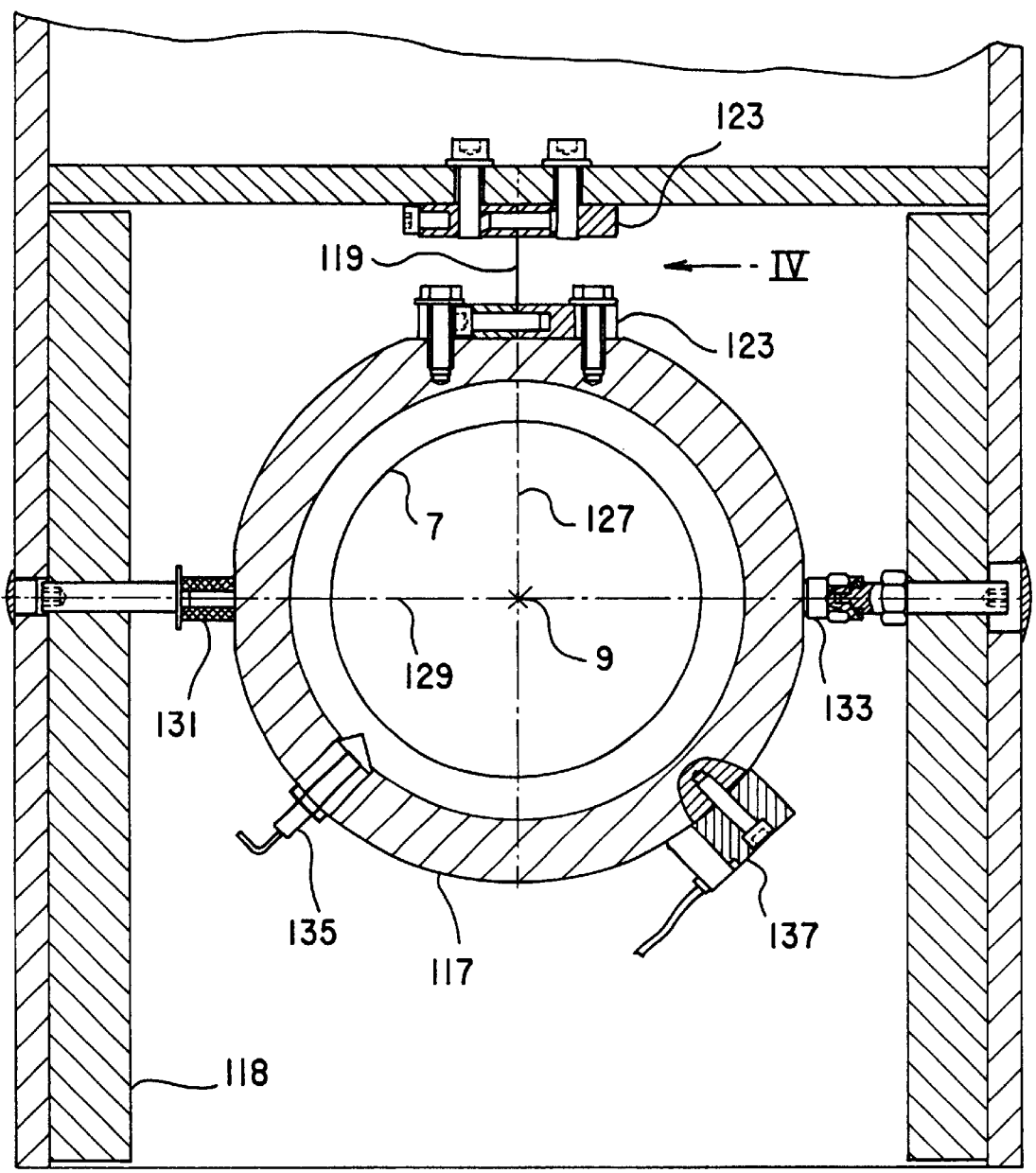
Figure 4:
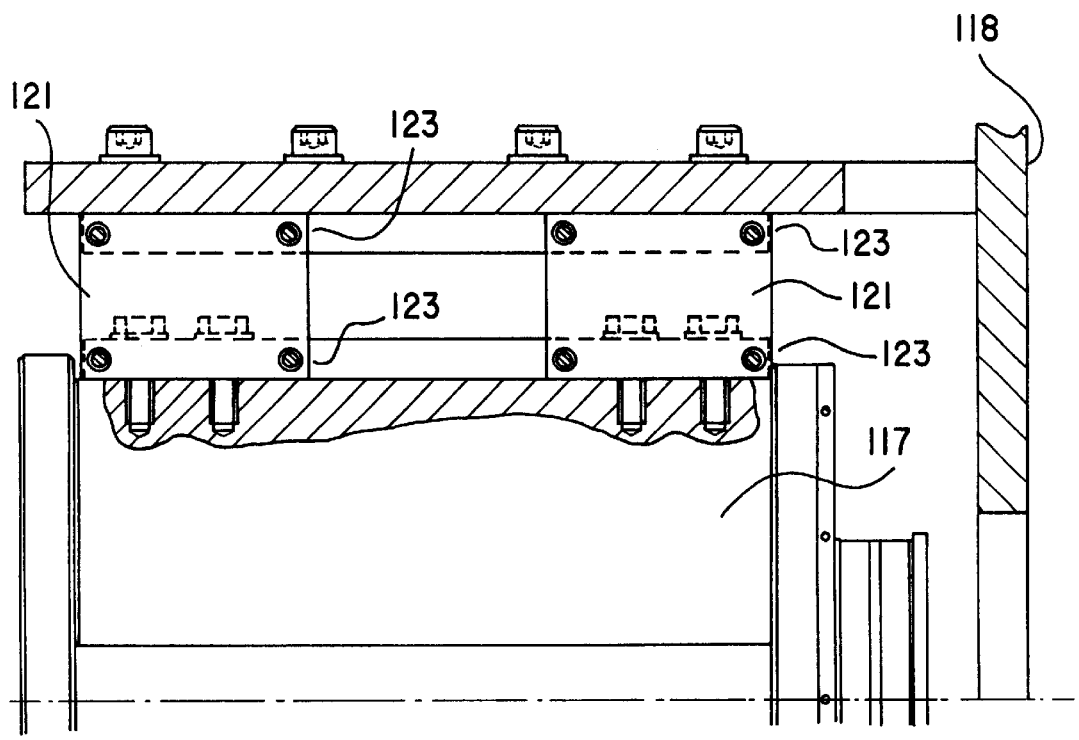
Figure 8:
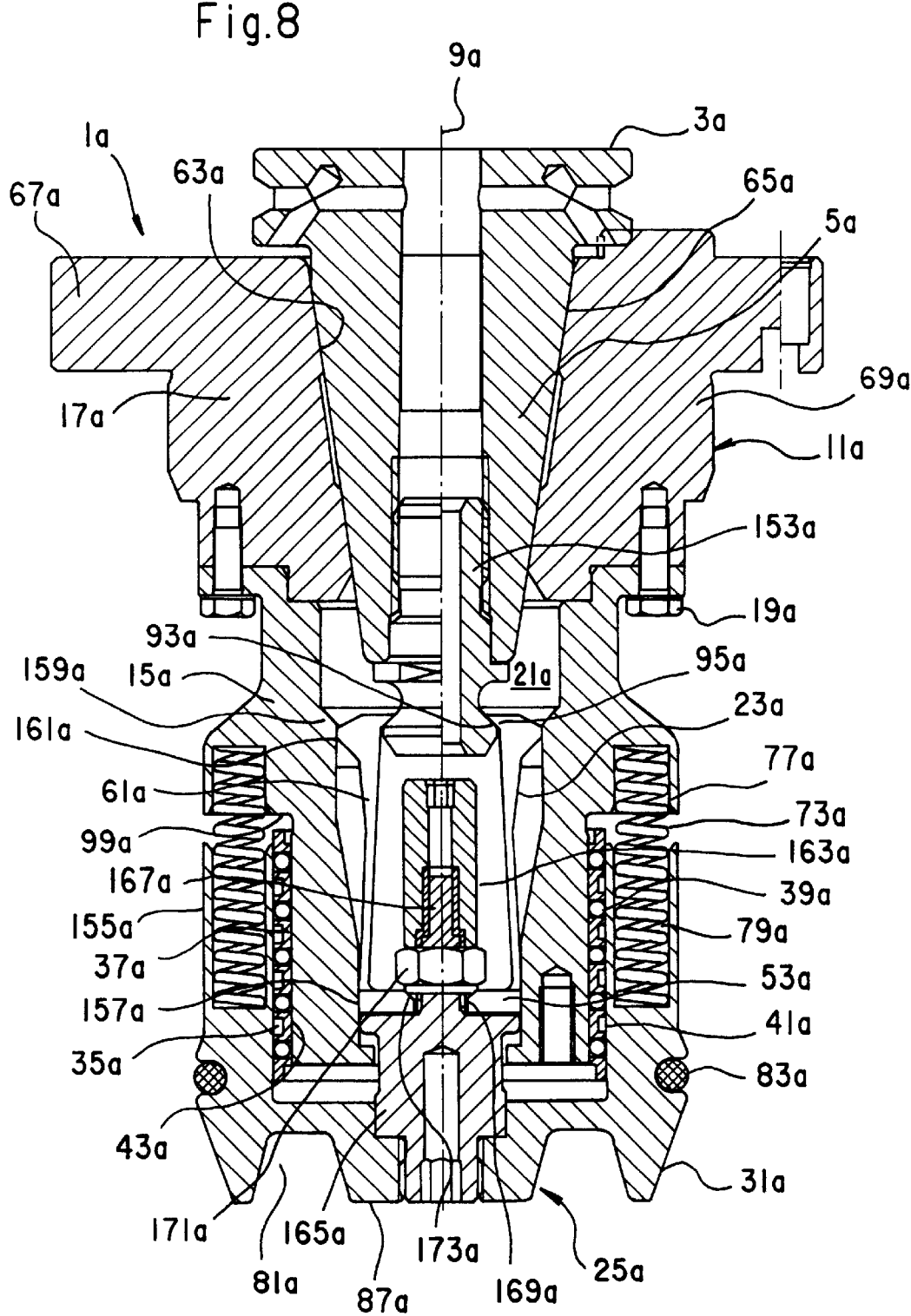

The invention will now be explained in more detail with reference to the appended drawings, in which:

FIG. 1 shows a longitudinal section through a first embodiment of the clamping device according to the invention when fitted in a balancing machine, FIG. 2 shows the way in which a supply of pressurized medium is connected to a hollow spindle of the clamping device shown in FIG. 1, FIG. 3 shows a sectional view of the balancing machine at right angles to the spindle axis, FIG. 4 shows a view in the direction of arrow IV in FIG. 3, FIG. 5 shows a perspective view of a ball guidance unit for axially guiding a chuck-actuating unit of the clamping device, FIG. 6 shows a detail of the clamping device, FIG. 7 shows a sectional illustration of the hollow spindle, and FIG. 8 shows a longitudinal section through a further embodiment of the clamping device according to the invention.

The clamping device shown in FIG. 1 has a clamping set, which is denoted overall by 1, for clamping a tool holder 3 with a standardized hollow steep-taper coupling shank 5. The clamping set 1 is mounted at an axial end of a hollow spindle 7 which can be driven about its spindle axis 9 by means of drive means (not shown in more detail), preferably a drive belt. The clamping set 1 comprises a base body unit 11, which is screwed to the hollow spindle 7 by attachment screws 13. The base body unit 11 is composed of a partial base body 15 and a partial base body 17, which can be screwed together by attachment screws 19. A receiving opening 21, into which the coupling shank 5 of the tool holder 3 is inserted and in which a chuck 23, by means of which the coupling shank 5 of the tool holder 3 can be clamped securely to the base body unit 11, is arranged so that it is fixed in the axial direction, extends axially through the base body unit 11, centrally with respect to the axis of rotation 9. To clamp the chuck 23, there is a chuck-actuating unit 25 which comprises an actuating head 27, which engages on the chuck 23, an adjoining actuating shank 29, which extends out of that end of the receiving opening 21 which is remote from the tool holder, and an actuating piston 31, which can be screwed securely to the actuating shank 29 by means of an attachment screw 33. The chuck-actuating unit 25 can move in the direction of the axis 9 relative to the base body unit 11 and is guided axially on the base body unit 11 by means of an annular ball guidance unit 35. This ball guidance unit 35 is designed as a ball cage and is pushed onto the actuating shank 29, specifically from its end which is axially remote from the tool holder 3. The ball guidance unit 35 comprises a cage 37, which is preferably made from plastic and contains a multiplicity of individual receptacles for balls 39. The balls 39 roll along a cylindrical outer lateral surface 41 of the actuating shank 29 and along a cylindrical inner lateral surface 43, which is concentric with respect to the outer lateral surface, of the receiving opening 21. They are preloaded between these two rolling surfaces 41, 43, so that any radial movement tolerances between the chuck-actuating unit 25 and the base body unit 11 are avoided. The preloading may be selected in such a way that the diameter of the balls 39 in the uninstalled state is a few micrometers, for example 1 to 2 µm, greater than the radial distance between the rolling surfaces 41, 43.

On its outer circumference, the actuating head 27, which is connected integrally to the actuating shank 29, has a first section 45 which tapers conically away from the tool holder 3 and a second cone section 47 which adjoins the first cone section 45 on the side of the latter which is axially remote from the tool holder 3 and likewise tapers toward the actuating shank 29, but with a greater degree of inclination with respect to the axis 9 than the first cone section 45.

A cylindrical cutout 49, which in the axial direction extends as far as close to the underside of the partial base body 15 which is also referred to as the chuck holder and on the radially inner side leaves an axially extending annual flange 51, on the inner lateral surface of which the rolling surface 43 is formed, is machined into the partial base body 15 from the side which axially faces the tool holder 3. The chuck 23 is of single-part design and, at its end which is axially remote from the tool holder 3, has a radially projecting base section 53, by means of which, at the bottom of the annular cutout 49, it is screwed to the chuck holder 15. For this purpose, the base section 53 includes a plurality of threaded bores 55 which are distributed in the circumferential direction and are axially flush with passage holes 57 which pass axially through the base wall of the chuck holder 15 in the radial region of the annular cutout 49. The base section 53 of the chuck 23 is screwed to the chuck holder 15 by means of attachment screws 59. These attachment screws 59 can be inserted into the passage holes 57 and the threaded bores 55 from that axial side of the chuck holder 15 which is remote from the tool holder, which ensures ease of assembly.

The base section 53 of the chuck 23 merges integrally, axially toward the tool holder 3, into a plurality of resilient tongues 61, which are separated from one another, in a manner which is not illustrated in more detail, by axial slots which penetrate radially all the way through the wall of the chuck 23 and in the axial direction are open toward the tool holder 3, so that the tongues 61 can be spread open in the radial direction.

The partial base body 17, which may also be referred to as a holder adapter (i.e. an adapter for the tool holder 3), is designed with locating surfaces 63 against which complementary mating locating surfaces 65 of the tool holder 3 can bear. The design of the locating surfaces 63 of the holder adapter 17 is, of course, dependent on the type and size of the tool holder 3 which is in each case to be clamped. The holder adapter 17 for its part has a radially projecting annular flange 67 which, during assembly of the clamping device 1, comes to bear flat against an axial end face 68 of the hollow spindle 7 by means of its axially lower side. Axially adjacent to the annular flange 67, the holder adapter 17 has a wall section 69 which is at a radial distance from the inner lateral surface of the spindle 7. A further ball guidance unit 71, which centers the base body unit 11 on the hollow spindle 7, is fitted into this radial space. A more detailed explanation of the structure of this ball guidance unit 71 is given below with reference to FIG. 5.

The chuck-actuating unit 25 is preloaded axially away from the tool holder 3 by means of an arrangement of a plurality of helical compression springs 73 which are distributed in the circumferential direction. These springs 73 firstly rest in receiving pockets 77, which are machined into the chuck holder 15 in the form of axial bores from the side which is remote from the tool holder. Secondly, the springs 73 are fitted into receiving holes 79 which are drilled into the actuating piston 31. It is possible for all or only some of the pockets 77 and holes 79 to be occupied by springs 73, depending on the clamping force which is required for clamping the particular type of tool holder. The actuating piston 31 is approximately in disk form and has weight-reducing indentations 81 on both of its axial sides. It is sealed with respect to a cylindrical wall inner surface 85 of the hollow spindle 7 by an annular seal 83. The annular seal 83, which is expediently an O-ring, can contribute to the axial guidance of the chuck-actuating unit 25 and allows an axial sliding movement of the piston 31 along the wall inner surface 85 of the spindle 7. On its side which is axially remote from the tool holder 3, the actuating piston 31 has a surface 87 for pressure to act on, which can be exposed to a pressurized fluid. The hollow spindle 7 in this case serves as a pressure cylinder and, by means of its wall inner surface 85 and the surface 87 of the piston 31 for pressure to act on, delimits a pressure chamber 89, which, at its axial end which is remote from the piston, is delimited by a closure cover 91 illustrated in FIG. 2. If a pressurized fluid, in particular compressed air, is introduced into this pressure chamber 89, the piston 31 and, with it, the entire chuck-actuating unit 25 can be moved axially toward the tool holder 3 counter to the action of the springs 73.

FIG. 1 shows the clamped state of the clamping set 1. In this state, the pressure chamber 89 is unpressurized, with the result that the chuck-actuating unit 25 is pressed axially away from the tool holder 3 by the force of the springs 73. At their free ends, the tongues 61 are supported on the first cone section 45 of the actuating head 27, which on account of the action of the force from the springs 73 attempts to move in between the tongues 71 and to spread them further apart. Moreover, at their free ends the tongues 61 have a wedge surface 93, by means of which they are pressed against a mating wedge surface 95 which is formed on the inner lateral surface of the hollow steep-taper coupling shank 5 of the tool holder 3. The wedge engagement between the tool holder 3 and the tongues 61 which have been driven apart by the actuating head 27 leads to the tool holder 3 being clamped in a rotationally and axially fixed manner. If a pressure which exceeds the force of the springs 73 is generated in the pressure chamber 89, the chuck-actuating unit 25 is displaced toward the tool holder 3, with the result that the second cone section 47 of the actuating head 27 passes into the axial region of the free ends of the tongues 61. The tongues 61, which are prestressed radially inward, can then enter the free space which is created by the second cone section 47, leave the wedge engagement with the mating wedge surfaces 95 and release the coupling shank 5 of the tool holder 3. The latter can then be removed from the holder adapter 17.

During the axial relative movement of the chuck-actuating unit 25 with respect to the base body unit 11, the ball cage 35 is also displaced in the axial direction. It is recommended to limit the axial movement clearance of the ball cage 35 by means of axial stops, so that the ball cage 35 is always held securely in the annular space between the actuating shank 29 and the annular flange 51 and its balls 39 are held captively. For this purpose, a securing sleeve 97 is pushed onto the actuating shank 29, which sleeve, in the clamped position of the clamping device 1 which is shown in FIG. 1, forms a first axial stop for the ball cage 35 approximately at the axial height of the underside of the chuck holder 15. Toward the actuating head 27, a shoulder 99 of the actuating shank 29 forms a further axial stop for the ball cage 35.

On its lower edge, as shown in FIG. 1, the coupling shank 5 of the tool holder 3 has two diametrically opposite cutouts 101 which, during the balancing, can be used to determine the precise angular position of unbalanced locations. To enable the tool holder 3 to be clamped in a defined angular position, indexing screws 103, the heads of which project into the receiving opening 21 and, when the tool holder 3 is inserted in the correct angular position, engage with the cutouts 101 in the coupling shank 5, are screwed into the holder adapter 17 at diametrically opposite positions. Naturally, the indexing screws can also be removed if the clamped machine element does not have suitable cutouts.

Reference is now made to FIG. 2. The closure cover 91 is attached tightly to the hollow spindle 7, for example by screw connections. In the closure cover 91 there is a central connection opening 104 which offers the possibility of connecting a release device, which is denoted overall by 105 and by means of which pressurized fluid, in particular compressed air, can be introduced into the pressure chamber 89 in order to release the clamped tool holder. The release device 105 comprises a pressurized-fluid source 106, to which a pressurized-fluid feedline 107 is connected, which at its end remote from the source has a coupling unit 108 for coupling to the connection opening 104 of the closure cover 91. The coupling unit 108, which in FIG. 2 is not to scale when compared to the other components illustrated in that figure, comprises a tubular connection piece 109 which forms the actual coupling member and is guided displaceably, coaxially with respect to the spindle axis 9, in a coupling housing 110. In FIG. 2, the tubular connection piece 109 is shown in a retracted position, in which it is retracted to the maximum extent into the coupling housing 110. It bears an annular piston 111, by means of which it divides off a pressure chamber 113, into which the pressurized-fluid feedline 107 opens, in a cylindrical housing bore 112 of the coupling housing 110. The tubular connection piece 109 is preloaded into its retracted position, in which it bears tightly against the housing-side base of the pressure space 113, by a helical compression spring 114 which surrounds the tubular connection piece 109. As a result, a blocking location, which separates the channel running in the tubular connection piece 109 from the pressurized-fluid feedline 107, is formed in the retracted position of the tubular connection piece 109. If, as a result of pressurized fluid being fed into the pressure space 113, the pressure prevailing in that space increases, the tubular connection piece 109, after the restoring force of the spring 114 has been overcome, is lifted off the base of the pressure space 113, which leads to the abovementioned blocking location being opened and to the channel in the interior of the tubular connection piece 109 being connected to the pressurized-fluid feedline 107. During this advancing movement, the tubular connection piece 109 enters the connection opening 104 of the closure cover 91, with the result that pressurized fluid is introduced into the pressure chamber 89. A sealing ring 115 which is held in the connection opening 104 seals the tubular connection piece 109 with respect to the closure cover 91. The increase in pressure which occurs in the pressure chamber 89 causes the piston 31 to be lifted and the clamping set 1 to be transferred into its release position.

When the pressurized-fluid source 106 is switched off and the fluid pressure in the pressure space 113 falls sufficiently far for the restoring force of the spring 114 to gain the upperhand once again, the tubular connection piece 109 moves back out of the connection opening 104 and returns to its retracted position. The continuously open connection opening 104 allows the pressure to escape from the pressure chamber 89.

One advantage of this design of the release device 105 is that, when the clamping device is rotating, there is no coupling between the stationary release device 105 and the rotating closure cover 91, but rather the release device 105 is only coupled to the closure cover 91 in the at-rest position of the clamping device.

By means of a bearing arrangement 116, in particular a ball bearing arrangement, the spindle 7 is mounted in an axially fixed but rotatable manner in a cylindrical spindle housing 117.

Reference is now made to FIG. 3. In this figure, it can be seen that the spindle housing 117 is suspended in a frame 118. The suspension is articulated and is produced by means of a leaf spring arrangement 119, the leaf springs 121 of which can be seen in FIG. 4. There are two leaf springs 121, which are arranged at an axial distance from one another in the same radial plane. They are in each case arranged in the axial end regions of the spindle housing 117. They are in each case fixed to the spindle housing 117 and the frame 118 by means of clamping blocks 123. The two leaf springs 121, which are made, for example, from sheet steel, ensure that the spindle housing 117 and therefore the spindle 7 are suspended in such a manner that they are able to withstand tensile and shear forces in the direction of their radial extent. In FIG. 3, this direction is denoted by 127. The articulated nature of the suspension provided by the spring arrangement 119 exists transversely with respect to the radial direction 127, and in particular substantially perpendicular thereto. The direction in which the spindle housing 117 can be deflected in an articulated manner is denoted by 129 in FIG. 3. In this direction, the spindle housing 117 is supported loosely against a support buffer 131 which is fixed to the frame, whereas on the diametrically opposite side a force sensor 133 detects unbalance forces which are provoked by an unbalance of the clamped tool holder. In the direction of the axis of rotation 9, two such force sensors 133 are arranged at a distance one behind the other, in particular in each case in the region of one of the axial ends of the spindle housing 117. When measuring the unbalance of the tool holder, this is measured not just once, but twice, the second time, however, rotated through 180° C. This allows defects which remain constant to be determined and incorporated in the calculations. The pressure sensors 133 are, for example, piezoelectric pick-ups.

An inductive rotational speed sensor 135 which is held on the spindle housing 117 provides rotational speed signals for a control unit of the balancing machine. A magnetic sensor 137, which is likewise held on the spindle housing 117, allows the angular position of the spindle 7 and therefore of the clamped tool holder to be determined.

It can be seen from FIG. 5 that the balls 39 of the ball guidance unit 35 are arranged in a plurality of circumferential rows which follow one another at constant axial intervals. The balls of different circumferential rows are also offset with respect to one another in the circumferential direction, so that at every ball-occupied circumferential location of the cage 37 there is in each case only one ball 39. Each ball 39 therefore has its own axial rolling path along which it rolls along the chuck-actuating unit and the base body unit. It has been found that very high reproducibility can be achieved when measuring the unbalance of tool holders, or of machine elements in general, with a ball guidance unit 35 of this type.

FIG. 6 shows, in section, the ball guidance unit 71 which is inserted between the holder adapter 17 and the spindle 7. This unit has a cage 139, preferably made from plastic, in which, in a multiplicity of individual receptacles 141, in each case one ball 143 is held. The balls are distributed in the circumferential direction and are divided into two circumferential rows which are at an axial distance from one another, although only one of these rows is indicated in FIG. 6 by the ball 143 shown in that figure. In the region of both axial ends of the cage 139, an annular lip 145 or 147 which runs outward at an angle to the radial direction is formed in each case integrally. The two lips 145, 147 can be deflected flexibly and serve as preloading lips. The lip 147 generates a greater preloading force than the lip 145. When the ball guidance unit 71 is inserted into the hollow spindle 7, first of all the lip 145 is pressed toward the cage 139 to a certain extent, resulting in a slight prestress which substantially serves to captively hold the ball guidance unit 71 so that it does not unintentionally fall back out of the hollow spindle 7. Relatively little force is required to push the ball guidance unit 71 so deep into the hollow spindle 7 that the lip 147 comes to bear against the spindle edge. If the base body unit 11 with its holder adapter 17 is then fitted into the hollow spindle 7, the rolling contact between the wall section 69 of the holder adapter 17 and the balls 143 of the ball guidance unit 71 causes the latter to be pulled axially into the spindle 7 as well, so that the lip 147 slides over the spindle edge and is elastically deformed so as to produce a relatively high preloading force. This preloading force which is now relatively high results in precise centering of the base body 11 relative to the spindle 7.

The ball guidance unit 71 also allows rapid changing of the clamping set 1 with little force, since when the clamping set 1 is inserted into the hollow spindle 7 and when the clamping set 1 is removed, the balls 143 of the ball guidance unit 71 roll along the spindle 7 and along the partial base body 17, so that it is ensured that it can run easily yet nevertheless the clamping set 1 is to be fitted very precisely into the spindle 7 so as to minimize tolerances. As with the ball guidance unit 35, the balls 143 in the ball guidance unit 71 may likewise be prestressed in the assembled state of the clamping device. On account of its high guidance accuracy and good centering action, the ball guidance unit 71 also contributes to the smooth running of the spindle device.

If a different machine element is to be clamped, it is not necessarily imperative to exchange the entire clamping set 1. Rather, the fact that the base body unit 11 is divided into two parts makes it possible to exchange only the partial base body 17 and, if appropriate, the chuck 23. The partial base body 15 can be used unchanged for various partial base bodies 17 and various chucks 23. The universal usability of the chuck holder 15 and the chuck-actuating unit 25 guided thereon is favorable for the reproducibility of the unbalance measurements in that different machine elements can be measured under identical mechanical and design boundary conditions. The screw connections between the two partial base bodies 15, 17, between the chuck 23 and the partial base body 15 and between the spindle 7 and the partial base body 17, in combination with the ball guidance unit 71, allow the balancing machine to be reset without problems.

It can be seen from FIG. 7 that a vent channel 149 is formed in the wall of the spindle 7, which offers a venting feature if the clamping set 1 is removed when the pressure chamber 89 is pressurized. In such a situation, there is a risk of the clamping set 1 being catapulted out of the hollow spindle 7 on account of the pressure prevailing in the pressure chamber. Instead, the pressure in the pressure chamber 89 can escape via the vent channel 149. This runs from the pressure chamber 89 to the axial end face 68 against which, in the assembled state of the clamping device, the base body unit 11, especially its holder adapter 17, bears flat. If the screws 13 by means of which the base body unit 11 can be attached to the hollow spindle 7 are unscrewed, the pressure can escape from the pressure chamber 89 through the gap which forms between the base body unit 11 and the end face 68. This obviates the risk of operators being injured by a clamping set shooting out.

In the variant shown in FIG. 8, identical reference numerals, but with the addition of a lower case letter, are used for components which are identical or act in the same way as those shown in FIGS. 1 to 7. To avoid unnecessary repetition, reference is made to the statements given above in connection with FIGS. 1 to 7 for explanation of these components.

The clamping set 1a shown in FIG. 8 is designed specifically for tool holders 3a with a steep-taper coupling shank 5a. Its locating surfaces 83a are designed accordingly. Unlike in the embodiment shown in FIGS. 1 to 7, the chuck 23a is now guided so that it can move axially in the receiving opening 21a, the chuck-actuating unit 25a pulling on the chuck 23a so as to clamp the tool holder 3. The chuck 23a interacts, via the pair of wedge surfaces 93a, 95a, with a tie bolt 153a which has been screwed into the coupling shank 5a.

The piston 31a of the chuck-actuating unit 25a is of approximately cup-shaped design and, from the side which is remote from the tool holder, engages around the partial base body 15a, which in the present case can also be referred to as a chuck guidance body. An axially extending annular flange 155a of the piston 31a forms the lateral surface of this cup. The ball guidance unit 35a is accommodated between the cup lateral surface 155a and the chuck guidance body 15a. The rolling surfaces 41a, 43a along which the balls 39a roll are formed by a cylindrical inner circumferential surface of the annular flange 155a and by a cylindrical outer circumferential surface of the chuck guidance body 15a.

In the region of the base section 53a of the chuck 23a, the inner lateral surface of the receiving opening 21a has a cylindrical section 157a which, together with a cylindrical outer circumferential surface of the base section 53a, forms a pair of locating surfaces, it being possible in this case for the fit here to be a joint or transition fit which effects axial guidance of the chuck 23a on the chuck guidance body 15a. In the region of their free ends, the tongues 61a of the chuck 23a are supported resiliently on the inner lateral surface of the receiving opening 21a, which has a section 159a which tapers conically away from the tool holder 3a and an adjoining section 161a which is either cylindrical or also tapers conically, but with a lesser inclination with respect to the axis of rotation 9a than the conical section 159a. When a pressurized fluid is applied to the piston 31a, the chuck-actuating unit 25a is pressed upward, counter to the action of the force of the springs 73a in FIG. 8, until the ends of the tongues 61a can escape into the free space which has been left open by the conical section 159a, leading to the tie bolt 153a being released. As the upward movement of the chuck-actuating unit 25a continues, an ejector 163a which is attached to this unit ultimately presses the tool holder 3a out of its seat in the clamping device 1a.

If, during clamping, the radially outer sides of the free tongue ends of the chuck 23 come into engagement with the section 161a of the receiving opening 21a, they preferably bear flat against this section 161a, so that then the chuck 23 is guided axially at both its ends. This avoids any true-running faults which could arise from the axial mobility of the chuck 23a relative to the base body unit 11a.

On its base section 53a, the chuck 23a is held loosely on a connecting piece 165a which extends out of that end of the receiving opening 21a which is remote from the tool holder and is screwed securely into the piston 31a. A central threaded pin 167a, onto which a central passage hole 169a in the chuck 23a is fitted, projects axially from the connecting piece 165a. To hold the chuck 23a on the connecting piece 165a, a nut 171a is screwed onto the threaded pin 167a. This nut 171a forms a locking nut for the ejector 163a, which is likewise screwed onto the threaded pin 167a. The base section 53a of the chuck 23a is now held between the nut 171a and the connecting piece 165a. Where the text above has referred to loose holding, this term is intended to mean that the chuck 23a, in its base section 53a, has both radial play with respect to the threaded pin 167a and axial play with respect to the connection piece 165 and the nut 171a. This decoupling of the chuck 23a from the chuck-actuating unit 25a and separate guidance of the chuck 23a have produced a considerable improvement in the true-running accuracy and the reproducibility of the measurements.

The connecting piece 165a is centered on the chuck 23a by means of an edge surface 173a, which is inclined obliquely with respect to the axis of rotation 9, of the passage hole 169a if, in the clamped state of the clamping set 1a, the nut 171a is pulled onto the edge face 173a by the action of the force of the springs 73a.

It will be understood that the clamping set 1a shown in FIG. 8 may also be centered on the spindle by means of a ball cage as shown in FIGS. 1 and 6 and denoted by reference numeral 71 in those figures. The clamping set 1a may also readily be exchanged for the clamping set 1 shown in FIG. 1, without having to undertake any structural changes to the spindle, to the release device (cf. FIG. 2) or to the suspension of the spindle housing (cf. FIGS. 3 and 4).

What is claimed is:

1. A clamping device for clamping a machine element (3), which rotates about an axis of rotation (9), comprising:
    a base body unit (11) which has a receiving opening (21) which is central with respect to the axis of rotation (9) and into which a coupling shank (5) of the machine element (3) can be fitted axially from one end,
    a chuck (23) which is arranged in the receiving opening (21), and
    a chuck-actuating unit (25), which is guided on the base body unit (11) in such a manner that it can be displaced in the axial direction relative to the latter, for actuating the chuck (23),
    wherein the chuck-actuating unit (25) is axially guided by means of a rolling body arrangement (35) on the base body unit (11), the rolling bodies (39) of which arrangement roll along rolling surfaces (41, 43) of the base body unit (11) and of the chuck-actuating unit (25).

2. The clamping device as claimed in claim 1, characterized in that the rolling bodies (39) are fitted with prestress between the base body unit (11) and the chuck-actuating unit (25).

3. The clamping device as claimed in claim 1 characterized in that the rolling bodies (39) are formed by balls which are held in a cage (37) inserted between the base body unit (11) and the chuck-actuating unit (25).

4. The clamping device as claimed in claim 3, characterized in that the cage (37) is made from plastic.

5. The clamping device as claimed in claim 3 wherein the balls (39) are held individually, offset from one another in the circumferential direction, each ball in one recess in the cage (37).

6. The clamping device as claimed in claim 1, wherein at least a portion of the rolling body arrangement (35) resides inside the chuck (23).

7. The clamping device as claimed in claim 1, characterized in that the rolling body arrangement (35) is accommodated radially between a cylindrical inner lateral surface section (43) of the receiving opening (21) and a cylindrical outer lateral surface section (41) of a shank part (29), which extends axially in the receiving opening (21), of the chuck actuating unit (25).

8. The clamping device as claimed in claim 7, characterized in that the shank part (29) is formed integrally with a chuck-engagement head (27), which engages on the chuck (23), of the chuck-actuating unit (25).

9. The clamping device as claimed in claim 7, characterized in that the shank part (29) extends out of an end of the receiving opening (21) which is remote from the machine element (3), in that, at that location, a force-introducing body (31), which serves to introduce the actuating force, adjoins the shank part (29), and in that this force-introducing body (31) is approximately in the form of a disk.

10. The clamping device as claimed in claim 1, in which the chuck (23) is held on the base body unit (11) and is supported, by means of a clamping section (61), on the outer lateral surface (45, 47) of a cone head (27), which is substantially enclosed by this unit and tapers away from the machine element (3), of the chuck-actuating unit (25), characterized in that the chuck (23), in the region of its end (53) which is axially remote from the machine element (3), is mounted fixedly on the base body unit (11).

11. The clamping device as claimed in claim 10, characterized in that the chuck (23) can be screwed to the base body unit (11) and, for this purpose, has a plurality of axial receiving holes (55), which are distributed in the circumferential direction, for receiving attachment screws (59).

12. The clamping device as claimed in claim 10 characterized in that the chuck (23) extends as far as the bottom of an annular recess (49), which is central with respect to the axis of rotation (9) and is machined into the base body unit (11) from that side of this unit which axially faces the machine element (3), and is secured in this annular recess.

13. The clamping device as claimed in claim 1, in which the chuck (23) is held on the base body unit (11) and is supported, by means of a clamping section (61), on the outer lateral surface (45, 47) of a cone head (27), which is substantially enclosed by this unit and tapers away from the machine element (9), of the chuck-actuating unit (25), and in which the base body unit (11) comprises first partial base body (17), with bearing surfaces (63) which are intended to be in contact with the coupling shank (5) of the machine element (3), and a second partial base body (15), which is produced separately from the first partial base body (17), is connected firmly but releasably to this first partial base body and on which the chuck-actuating unit (25) is axially guided wherein the chuck (23) is held on the second partial base body (15).

14. The clamping device as claimed in claim 1, wherein the base body unit (11) bears at least one indexing projection (103), which is intended to engage in an indexing cutout (101) in the coupling shank (5) of the machine element (3).

15. The clamping device as claimed in claim 1, characterized in that the chuck-actuating unit (25a), on that side of the base body unit (11a) which is axially remote from the machine element (3a), has a force-introducing body (31a), which serves to introduce an actuating force and has an annular flange (155a), which projects toward the machine element (3a) and encloses an axial end section of the base body unit (11a), and in that the rolling body arrangement (35a) is accommodated radially between a cylindrical inner lateral surface section (41a) of the annular flange (155a) and a cylindrical outer lateral surface section (43a) of the axial end section of the base body unit (11a).

16. The clamping device as claimed in claim 15, characterized in that the chuck-actuating unit (25a) is unguided in the axial direction within the receiving opening (21a).

17. The clamping device as claimed in claim 1, in which the chuck (23*a*) is held on the chuck-actuating unit (25*a*) and the chuck-actuating unit (25*a*), in order to clamp the machine element (3*a*), pulls on the chuck (23*a*), characterized in that the chuck (23*a*) is held radially in a clearance fit on the chuck-actuating unit (25*a*) and is guided axially on the inner lateral surface (157*a*, 161*a*) of the receiving opening (21*a*).

18. The clamping device as claimed in claim 17, characterized in that the chuck (23*a*), in the region of its end which is axially remote from the machine element (3*a*), has a cylindrical outer lateral surface section (53*a*), by means of which it is axially guided on a cylindrical inner lateral surface section (157*a*) of the receiving opening (21*a*).

19. The clamping device as claimed in claim 17 characterized in that the chuck (23) has an axial clearance with respect to the chuck-actuating unit (25*a*), and an engagement surface (173*a*) of the chuck (23*a*), which is under tensile load from the chuck-actuating unit (25*a*), is designed as a centering surface, which is inclined toward the axis of rotation (9*a*), for the chuck-actuating unit (25*a*).

20. The clamping device is claimed in claim 1, characterized in that the chuck (23) is of single-part design.

21. The clamping device as claimed in claim 1, characterized in that the chuck (23) has a plurality of resilient tongues (61) which are distributed in the circumferential direction and are separated from one another by axially extending slots which penetrate radially through the chuck and are open toward the machine element (3) and closed away from the machine element (3).

22. The clamping device as claimed in claim 9 characterized in that at least one cutout (81), which serves primarily to save weight, is machined into the force-introducing body (31).

23. A clamping device for clamping a machine element (3), which rotates about an axis of rotation (9), comprising a drive spindle (7) which is mounted so that it can rotate about the axis of rotation (9), a clamping set (1) which can be mounted on the spindle (7), is preloaded in a clamping position by spring means, receives the machine element (3) and clamps it in a rotationally fixed manner in its clamping position, a base body unit (11) which has a receiving opening (21) which is central with respect to the axis of rotation (9) and into which a coupling shank (5) of the machine element (3) can be fitted axially from one end, a chuck (23) which is arranged in the receiving opening (21), a chuck-actuating unit (25), which is guided on the base body unit (11) in such a manner that it can be displaced in the axial direction relative to the latter, for actuating the chuck (23), and a release device (105) which, in order to release the machine element (3), transfers the clamping set (1) out of its clamping position into a release position and has a coupling member (109), which is arranged on a stationary part of the clamping device and, in the at-rest state of the clamping device, links the release device to components (91) of the clamping device which rotate when the clamping device is rotating, wherein the chuck-actuating unit (25) is axially guided by means of a rolling body arrangement (35) on the base body unit (11), the rolling bodies (39) of which arrangement roll along rolling surfaces (41, 43) of the base body unit (11) and of the chuck-actuating unit (25) and in that the coupling member (109) can be lifted off the rotating components of the clamping device, in such a manner that when the clamping device is rotating the coupling member is decoupled from the rotating components of the clamping device.

24. The clamping device as claimed in claim 23, wherein the coupling member (109) can be displaced between an advanced position, in which it is coupled to the rotating components, and a retracted position, in which it is decoupled from the rotating components, and means for resiliently preloading the coupling member into its retracted position.

25. The clamping device as claimed in claim 24, wherein the coupling member (109) can be transferred out of its retracted position into its advanced position by fluid pressure.

26. The clamping device as claimed in claim 23, wherein the clamping set (1) can be transferred out of its clamping position into its release position by fluid pressure, and for this purpose a piston-cylinder arrangement (7, 31), the piston (31) of which transmits a release force to the clamping set, is provided in the force-transmission path of the release force, which is generated by the release device (105).

27. The clamping device as claimed in claim 26, characterized in that the spindle (7) is designed as a hollow spindle which forms the cylinder of the piston-cylinder arrangement (7, 31).

28. The clamping device as claimed in claim 27, characterized in that the piston (31) is fixedly connected to an axially moveable actuating member (25) of the clamping set (1), in that a pressure chamber (89) formed in the spindle is delimited on one side in the axial direction by the piston and on the other side in the axial direction by a closure wall (91) which is arranged fixedly on the spindle, in that the closure wall has a connection opening (104) for connection of a pressurized-fluid feedline (107), and in that the pressurized-fluid feedline has a connection stub (109) which can be introduced into the connection opening and which forms the coupling member.

29. The clamping device as claimed in claim 28, characterized in that the connection stub (109), in its retracted position, forms a blocking location in the pressurized-fluid feedline (107), which is opened when the connection stub is transferred into its advanced position.

30. The clamping device as claimed in claim 29, characterized in that the connection stub (109) can be transferred into its advanced position by the fluid pressure of a pressurized-fluid supply (106), which at the same time feeds pressurized fluid into the pressurized-fluid feedline.

31. The clamping device as claimed in claim 28, wherein spring means (73) are supported on the piston.

32. The clamping device as claimed in claim 28, wherein a pressure-relief channel (149) connects the pressure chamber (89) with a spindle-side bearing surface (68) for the clamping set (1), the pressure-relief channel being formed in the circumferential wall of the spindle (7).

33. A clamping device for clamping a machine element (3), which rotates about an axis of rotation (9), comprising a drive spindle (7) which is mounted so that it can rotate about the axis of rotation (9) and is designed as a hollow spindle, and a clamping set (1) which can be mounted on the spindle (7), clamps the machine element (3) in a rotationally fixed manner in a clamping position, and comprises a base body unit (11) which can be inserted into the spindle from one spindle end, can be connected to the spindle from one spindle end, can be connected to the spindle in a rotationally and axially fixed manner and has a receiving opening (21) which is central with respect to the axis of rotation and into which a coupling shank (5) of the machine element (3) can be fitted in the axial direction, a base body unit (11) which has a receiving opening (21) which is central with respect to the axis of rotation (9) and into which a coupling shank (5) of the machine element (3) can be fitted axially from one end, a chuck (23) which is arranged in the receiving opening (21), and a chuck-actuating unit (25), which is guided on the base body unit (11) in such a manner that it can be displaced in the axial direction relative to the latter, for actuating the chuck (23), wherein the chuck-actuating unit (25) is axially guided by means of a rolling body arrangement (35) on the base body unit (11), the rolling bodies (39) of which arrangement roll along rolling surfaces (41, 43) of the base body unit (11) and of the chuck-actuating unit (25) and in that a ball cage (71), which centers the base body unit on the spindle, is fitted radially between the base body unit (11) and the spindle (7).

34. A measuring device for measuring the unbalance of a machine element (3), which rotates about an axis of rotation (9), comprising a drive spindle (7) which is mounted in a spindle housing (117) in such a manner that it can rotate about the axis of rotation (9), a frame (118), from which the spindle housing is suspended, a force sensor arrangement (133) which detects unbalance forces on the spindle housing (117), and clamping means for clamping the machine element (3) in a rotationally fixed manner on the spindle (7), wherein the clamping means comprises:

a base body unit (11) which has a receiving opening (21) which is central with respect to the axis of rotation (9) and into which a coupling shank (5) of the machine element (3) can be fitted axially from one end, a chuck (23) which is arranged in the receiving opening (21), and a chuck-actuating unit (25), which is guided on the base body unit (11) in such a manner that it can be displaced in the axial direction relative to the latter, for actuating the chuck (23), wherein the chuck-actuating unit (25) is axially guided by means of a rolling body arrangement (35) on the base body unit (11), the rolling bodies (39) of which arrangement roll along rolling surfaces (41, 43) of the base body unit (11) and of the chuck-actuating unit (25).

35. The measuring device as claimed in claim 34, characterized in that the spindle housing (117) is suspended from the frame (118) by means of a leaf spring arrangement (119) in such a manner that it is fixed so that it cannot be pushed or pulled in a first direction (127) which is normal to the axis, but can be pivoted in a second direction (129) which runs normal to the axis and transversely, in particular substantially perpendicularly, to the first direction (127), and the force sensor arrangement (133) is arranged so as to detect force components in the second direction (129).

36. The device as claimed in claim 35, characterized in that the leaf spring arrangement (119) comprises two leaf springs (121) which are arranged at an axial distance from one another, extend radially in the first direction (127) and by means of which the spindle housing (117) is suspended from the frame (118).

* * * * *